United States Patent [19]

Ueyanagi

[11] Patent Number: 5,760,290
[45] Date of Patent: Jun. 2, 1998

[54] SEMICONDUCTOR ACCELERATION SENSOR AND TESTING METHOD THEREOF

[75] Inventor: Katsumichi Ueyanagi, Kawasaki, Japan

[73] Assignees: Fuji Electric Co., Ltd., Kanagawa; Fujitsu Ten Limited, Hyogo, both of Japan

[21] Appl. No.: 553,721

[22] Filed: Oct. 23, 1995

[30] Foreign Application Priority Data

Oct. 21, 1994 [JP] Japan ................................. 6-256587

[51] Int. Cl.$^6$ ................................................ G01P 21/00
[52] U.S. Cl. ........................ 73/1.39; 73/1.38; 73/514.33
[58] Field of Search .......................... 73/514.33, 514.38, 73/514.24, 1 D, 514.32, 514.21, 514.23, 514.36

[56] References Cited

U.S. PATENT DOCUMENTS

| | | |
|---|---|---|
| 3,397,278 | 8/1968 | Pomerantz . |
| 4,553,436 | 11/1985 | Hansson ........................... 73/514.33 |
| 4,882,933 | 11/1989 | Petersen et al. .................. 73/514.33 |
| 5,060,504 | 10/1991 | White et al. ...................... 73/514.33 |
| 5,095,752 | 3/1992 | Suzuki et al. .................... 73/514.33 |
| 5,103,667 | 4/1992 | Allen et al. ...................... 73/1 D |
| 5,264,075 | 11/1993 | Zanini-Fisher et al. ........... 156/633 |

FOREIGN PATENT DOCUMENTS

| | | |
|---|---|---|
| 368 446 | 5/1990 | European Pat. Off. . |
| 492 986 | 7/1992 | European Pat. Off. . |
| 39 22 476 | 1/1991 | Germany . |
| 44 19 267 | 12/1994 | Germany . |
| 44 26 590 | 2/1995 | Germany . |
| 1-240865 | 9/1989 | Japan . |
| 4-301770 | 10/1992 | Japan . |
| 2 266 151 | 10/1993 | United Kingdom . |
| 2 280 307 | 1/1995 | United Kingdom . |

OTHER PUBLICATIONS

M. Leonard, "IC Fabrication Techniques Sculpt Silicon Sensors" Electronic Design, Oct. 26, 1989 pp. 39–46.
W. Inersen, "The Vendors are Betting Their Chips on Silicon Sensors" Electronics, Jul. 1989, pp. 54–59.
S. Büttgenbach, "Mikromechanik" B.G. Teubner, Stuttgart, 1991, pp. 134–136, 168–171.
K. Albaugh, "Electrode Phenomena during Anodic Bonding of Silicon to Sodium Borosilicate Glass" J. Electrochem. Soc., vol. 138, No. 10, Oct. 1991, pp. 3089–3094.
G. Wallis et al., "Field Assisted Glasses–Metal Sealing" Journal of Applied Physics, vol. 40, No. 10, Sep. 1969, pp. 3946–3949.
Japanese publication No. 1-240865 with Abstract attached; Sep. 26, 1989, pp. 451–455.

Primary Examiner—John E. Chapman
Attorney, Agent, or Firm—Spencer & Frank

[57] ABSTRACT

A semiconductor acceleration sensor has a silicon detecting body and a glass substrate. The silicon detecting body has a weight, a supporting frame, and beams for coupling the weight to the supporting frame, which are integrally processed from a silicon wafer. At least one semiconductor strain gauge is formed on a surface of a beam. The glass substrate is electrostatically joined with the supporting frame of the silicon detecting body. Furthermore, a gap portion is formed between a surface of the glass substrate and a lower surface of the weight.

12 Claims, 5 Drawing Sheets

SEMICONDUCTOR ACCELERATION SENSOR AND TESTING METHOD THEREOF

BACKGROUND OF THE INVENTION

1. Field of the Invention

The present invention generally relates to an acceleration sensor (accelerometer) for sensing the change of velocity with respect to time. More specifically, the present invention is directed to a semiconductor accelerometer of the type using a strain-gauge, utilizing the change in resistance caused by expansion or constriction of a semiconductor, and also to a method for testing the acceleration sensor.

2. Description of the Prior Art

Heretofore, accelerometers have been used in many industrial fields and are generally grouped into the following types:

(i) a servo type accelerometer that detects a displacement of a weight member or a thin plate from a balanced position when it receives the influence of acceleration;

(ii) a piezoelectric type accelerometer that uses a piezo-electric material which is responsible for generating electric force or charges in relation to a degree of strain that is caused; and (iii) a strain-gauge type accelerometer that uses the variation in resistance caused by the expansion and contraction of a metal or semiconductor.

In the automobile industry, by way of example, accelerometers have been used in so-called airbag systems for ensuring the safety of a passenger on the occasion of a traffic accident. The airbag system is responsible for preventing the driver from bumping against the steering wheel or the like by a sudden expansion of the airbag when an accelerometer therein senses a sudden reduction in velocity as a result of an accident or the like. In this case, the driver's safety is directly depended on the accelerometer's condition, so that the accelerometer of the airbag system must be of high reliability. Therefore, a small-sized semiconductor accelerometer comprising strain-gauges on a semiconductor substrate has been tried out in the above airbag system.

In general, there are two types of semiconductor strain-gauges, a bulk type and a diffusion type. The conventional methods for manufacturing integrated circuits can be used for preparing the diffusion-type strain-gauge, so that it is possible to integrate an amplification circuit, a compensation circuit, and the like on a common substrate. Furthermore, the influence of temperature variation on the strain-gauge can be precisely compensated by integrating a bridge circuit into the strain-gauge.

Usually, the performance of a semiconductor accelerometer can be estimated by performing a vibration test (accelerating test) using a large-sized vibration test machine. For manufacturing an accelerometer that works stably at all times, the accelerometer is subjected to processing which includes the step of compensating for variations in the accelerometer's sensitivity by using the compensation circuit.

In order to perform the above test in large quantities, a plurality of the test machines should be operated simultaneously for testing a plurality of the semiconductor accelerometers at the same time. Thus, the process takes a lot of time and leads to extremely high production costs.

To solve the problems, as shown in FIG. 1, Allen and his coworkers have proposed an accelerometer which is capable of testing and calibrating itself in U.S. Pat. No. 5,103,667.

In FIG. 1, the accelerometer comprises a silicon frame 120, a silicon cap 140, a silicon mass 110, and a silicon base 150. In addition, the silicon mass 110 is supported by the silicon frame 120 with the aid of flexures 112, 114 on which piezo-resistors 130, 132 are formed. An opening or recess of the cap 140 is oriented toward the silicon frame 120 so as to form an air gap 142 between these members. As shown in the figure, furthermore, there is a deflection electrode 160 disposed on an inner surface of the cap 140. On the other hand, the mass 110 is arranged so as to look toward the silicon base 150 and form an air gap 152 between these members. The frame 120 has a pad 161 on its surface. The electrode 160 is connected with the pad 161 electrically by means of a metal conductor 180 formed on a surface of the cap 140.

In the conventional example of FIG. 1, the silicon frame 120, the silicon cap 140, and the silicon base 150 are connected or bonded together. If a bonding agent, solder, or other possible means for connecting them together is used to realize the configuration in FIG. 1, there is a possibility of deterioration of the bonding or connecting layers. Therefore, there is a danger that the reliability of the accelerometer may fall. In order to control the air gaps 142 and 152, the thickness of the connecting or bonding layers should be also controlled. However, this is technically hard for one to do.

By the way, electrostatic-bonding (anode-bonding) has been known as a bonding process without using any bonding agent or bonding material. The process includes the steps of contacting the silicon and the glass and applying a voltage of about 600 volts to them at 300°–500° C. to cause migration of alkali-ions of the glass toward their interface, resulting in a space-charge layer forming around their interface. The space-charge layer is responsible for generating static electricity to form a chemical bond between the silicon and the glass. The chemical bond may be a result of forming $SiO_2$ in the interface between the silicon and the glass by binding Si with O$^-$ that migrates through the glass under the electric field.

In the case of using the electrostatic-bonding process for bonding two silicon materials together, as shown in the U.S. patent document described above, a $SiO_2$ membrane is formed on a bind surface of each silicon material to be attached by means of wet-oxidation, and at the same time a lot of SiOH groups are formed in the SiO2 membrane because of using H$^+$ as a carrier for the reaction represented as:

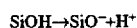

$$SiOH \rightarrow SiO^- + H^+$$

However, an aluminum material, which is generally provided for electrical wiring, cannot be used in the above process of electrostatic-bonding because the process includes the step of subjecting the material to the high temperature of 900° C. During the process, furthermore, the device on which the circuit is formed can be affected by such a thermal condition. Consequently, it is difficult to use electrostatic-bonding in the process of manufacturing semiconductor accelerometers in a practical manner.

To solve this problem, one can consider using a glass cap instead of the silicon cap 140 in order to perform the step of electrostatic bonding with the silicon frame at the temperature of 300° to 500° C.

FIGS. 2A and 2B show one example of a conventional accelerometer in which a cap layer 200 and a substrate 300 are made of glass while a detector 100 is made of silicon. They are joined together as layers by means of electrostatic-bonding at a relatively low temperature. In these figures, FIG. 2A is a cross-sectional overall view of the conventional accelerometer and FIG. 2B is an enlarged view of the part surrounded by a broken line in FIG. 2A.

An inner side hollow 201 of the cap 200 has an electro-conductive membrane 202 which extends toward a bonding surface 400 thereof and provides electrical wiring connected with the silicon detector 100. A plurality of semiconductor strain-gauges 104 on flexures 101 form a Wheatstone bridge circuit having a ground that is connected to both the silicon detector 100 and the mass 102. The silicon detector 100 comprises a frame 103 for supporting the mass 102 by the flexures 101. A surface of the frame 103 is electrostatically connected with the base 300 so as to form a hollow 301.

For realizing the above construction, however, it is necessary to connect the electrode 202 with the silicon detector 100 by passing it from the cap's hollow 201 to the bonding or contacting surface 400. As shown in FIG. 2B, furthermore, the cap's end facing to the base should be formed as an inclined plane to make a space between the cap and the base, so that it is difficult to keep the bonding or connecting surface 400 even. Therefore the bonding or connecting surface 400 would not be reliable with respect to its mechanical strength. Especially in the case of using the accelerometer as a collision-detecting sensor in an automobile's airbag system, the sensor should be constructed to have high reliability in its mechanical strength. Otherwise, the sensor would be inferior and may cause a fatality. For avoiding such problems, one might consider enlarging the contacting and bonding areas. However, this would cause other problems such as an increase of its manufacturing cost as a result of increased chip-size. In general, glass material can be subjected to the process of electrostatic bonding. Comparing glass with silicon, however, it is very difficult to make a small recess (5–15 μm) on a surface of the glass and it costs a great deal.

Furthermore, a chip can in general be sliced into wafers having a three layer structure of different materials (i.e., silicon and glass) by using a dicing cutter. In this case, however, the slicing must be performed at an extremely low speed of 1–5 mm/second because of slicing the chip made of different materials, resulting in high manufacturing cost.

SUMMARY OF THE INVENTION

An object of the present invention is to provide a semiconductor accelerometer with high reliability.

Another object of the present invention is to provide such a semiconductor acceleration sensor whose manufacturing cost is comparatively low, and which can be easily tested, or calibrated without using large-scaled acceleration testing machines.

A further object of the present invention is to provide a method for testing a characteristic of a semiconductor acceleration sensor without utilizing large-scaled acceleration testing machines.

To achieve the above-described objects, a semiconductor acceleration sensor, according to one aspect of the present invention, is characterized by comprising:

In a first aspect of the present invention, there is provided a semiconductor acceleration sensor, comprising:
  a silicon detecting member having a weight, a supporting frame, and a beam for coupling the weight with the supporting frame, which are integrally processed from a silicon wafer;
  at least one semiconductor strain gauge formed on a surface of the beam;
  a glass substrate electrostatically joined with the supporting frame of the silicon detecting member; and
  a gap portion formed between a surface of the glass substrate and a lower surface of the weight.

The width of the gap portion may be in the range of 4 μm to 20 μm.

The beam may be part of a system of beams which are arranged in the shape of a four bridge structure.

The upper surface of the glass substrate may have a portion facing to the weight, which portion includes: a region on which a conductive film having an area larger than the area of the weight is disposed; and a wiring part which is an elongated part of the conductive film extending to a side portion of the glass substrate, and the silicon detecting member has a through-hole or recess for permitting external wiring to be connected to the conductive film, formed at a portion facing the wiring part of the glass substrate.

In a second aspect of the present invention, there is provided a method for testing a semiconductor acceleration sensor, comprising the steps of:

(i) providing a semiconductor acceleration sensor as a test device, having: a silicon detecting member having a weight, a supporting frame, and a beam for coupling the weight with the supporting frame, which are integrally processed from a silicon wafer; at least one semiconductor strain gauge formed on an upper surface of the beam; a glass substrate electrostatically jointed with the supporting frame of the silicon detecting member; and a gap portion formed between an upper surface of the glass substrate and a lower surface of the weight, (ii) applying an alternating current on the conductive film so as to generate a potential difference between the silicon detecting member and the conductive film, and (iii) generating false acceleration by an effect of electrostatic force between the conductive film and the lower surface of the weight to perform a calibration.

The gap may have a width of 4 μm to 20 μm.

The beam may be part of a system of beams arranged in the shape of a four bridge structure.

The upper surface of the glass substrate may have a portion facing to the weight, which portion includes: a region on which a conductive film having an area larger than the area of the weight is disposed; and a wiring part which is an elongated part of the conductive film extending to a side portion of the glass substrate, and the silicon detecting member has a through-hole or recess for permitting external wiring to be connected to the conductive film, formed at a portion facing the wiring part of the glass substrate.

The relationship between a voltage applied on the conductive film and the value of the false acceleration may be indicated as a characteristic curve which is used as a calibration curve.

In a third aspect of the present invention, there is provided a method of manufacturing a semiconductor acceleration sensor, comprising the steps of:

preparing a silicon detecting member having a weight, a supporting frame, and a beam for coupling the weight with the supporting frame, which are integrally processed from a silicon wafer, where at least one semiconductor strain gauge is formed on an upper surface of the beam;

forming a conductive film and a wiring portion thereof on a surface of a glass substrate;

electrostatically jointing the glass substrate with the supporting frame of the silicon detecting member; and forming a gap portion between an upper surface of the glass substrate and a lower surface of the weight.

The width of the gap portion may be in the range of 4 µm to 20 µm.

The beam may be part of a system of beams arranged in the shape of a four bridge structure.

The upper surface of the glass substrate may have a portion facing to the weight, which portion includes: a region on which a conductive film having an area larger than the area of the weight is disposed; and a wiring part which is an elongated part of the conductive film extending to a side portion of the glass substrate, and the silicon detecting member has a through-hole or recess for permitting external wiring to be connected to the conductive film, formed at a portion facing the wiring part of the glass substrate.

DETAILED DESCRIPTION OF THE INVENTION

Referring with the attached figures, the preferred embodiments of the present invention will now be explained.

Figure 1:
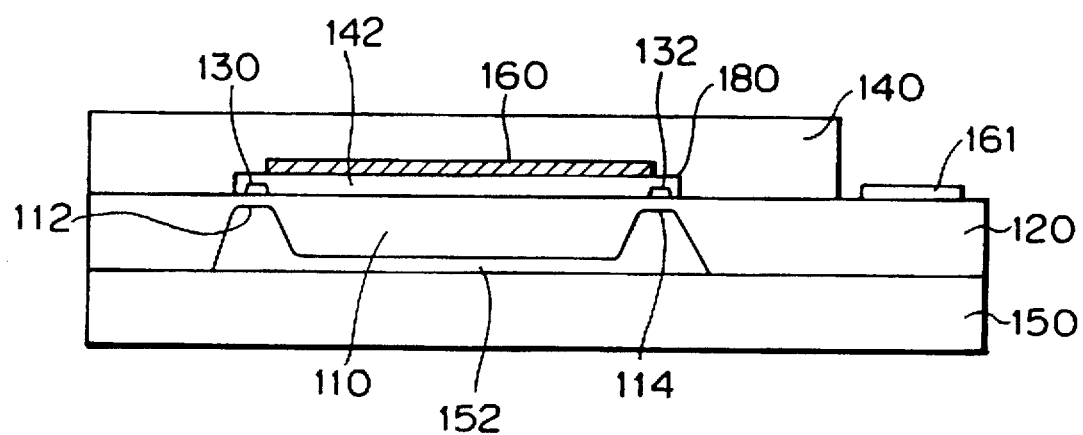
FIG. 1 is a sectional view of one of the conventional semiconductor accelerometers.
Figure 2A:
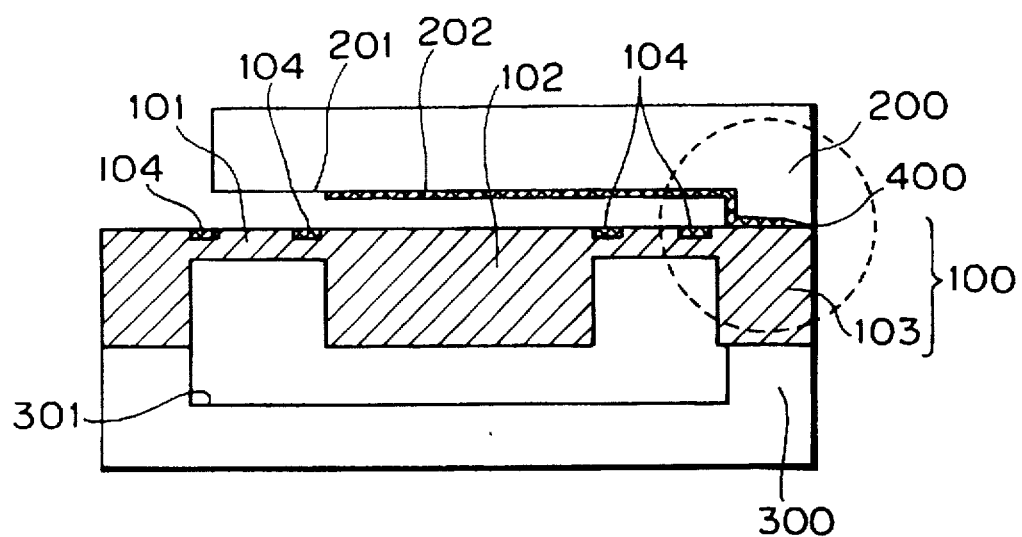
FIG. 2A is a sectional view of another conventional semiconductor accelerometer.
Figure 2B:
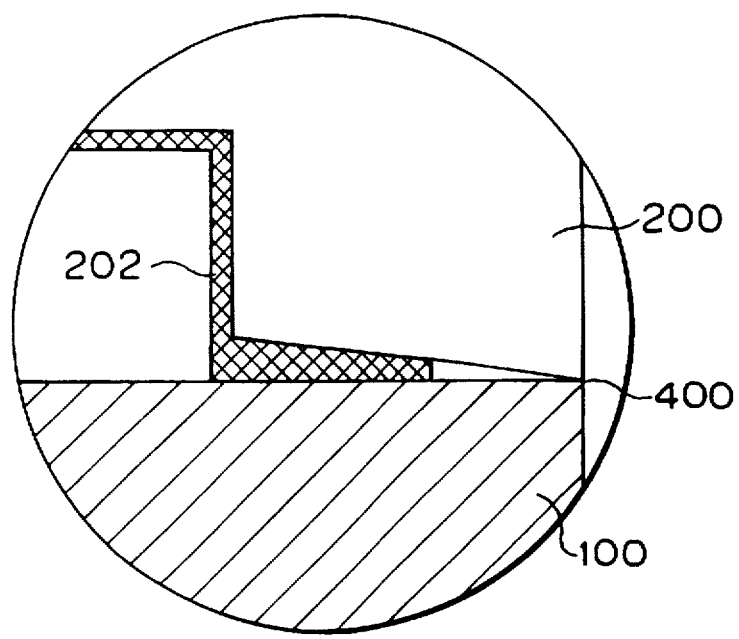
FIG. 2B is an enlarged view of part of the conventional semiconductor accelerometer shown in FIG. 2A.
Figure 3:
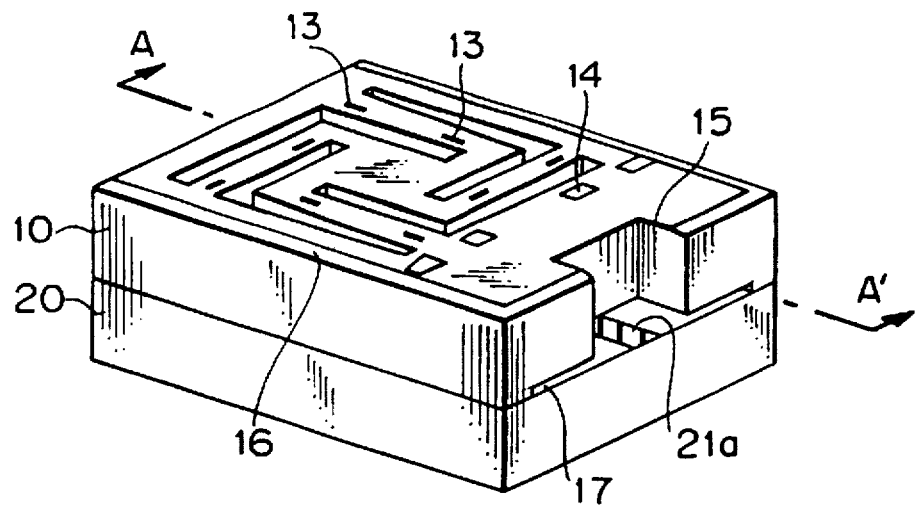
FIG. 3 is a perspective view of the first embodiment of a semiconductor accelerometer according to the present invention.
Figure 4:
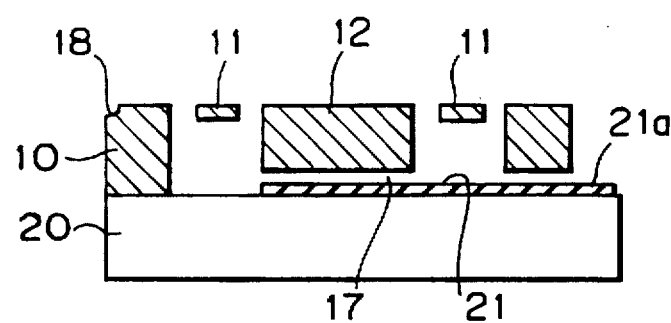
FIG. 4 is a cross sectional view along the line A—A' of the semiconductor accelerometer shown in FIG. 3.

FIG. 3 is a perspective view of the first embodiment of a semiconductor accelerometer according to the present invention. FIG. 4 is a cross-sectional view along the line A—A' of the semiconductor accelerometer shown in FIG. 3.

The semiconductor accelerometer of the present embodiment comprises a base plate 20 made of glass; a silicon detector 10 prepared by integrally processing silicon material by means of micro-machining technology; and an electroconductive membrane 21 provided on the glass base plate 20.

The silicon detector 10 comprises beams 11 in the shape of Indian swastika on which semiconductor strain gauges 13 are arranged. A weight 12 is arranged in the middle of the detector 10 and supported by the beams 11. A supporting frame 16 has pads 14 which are formed as output signal elements to be connected with an external device. The beams 11, weight 12, and frame 16 are integrally processed during fabrication of the detector 10.

Semiconductor strain gauges are well-known to people skilled in the art, and the strain gauges 13 of the present embodiment can be prepared by one of the well-known methods. In this embodiment, the semiconductor strain gauges form a Wheatstone bridge circuit (not shown) so as to produce an output difference when an acceleration is generated. A base electrode of the silicon detector 10 makes a connection with a supply electrode for the Wheatstone bridge circuit. Furthermore, a gap 17 is formed between the weight 12 and the glass base plate 20.

According to such construction, the semiconductor accelerometer is able to inhibit an excessive vibration caused by the resonant frequency of the structure consisting of the beams 11 and the weight 12 by a squeeze film effect generated in the gap between the weight and the glass base plate 20.

The electroconductive membrane 21 disposed on a surface of the glass base plate 20 has an end portion 21a thereof for making a connection with an external device. The end portion 21a extends to the edge of the glass base plate 20. As shown in the figure, a part of one end of the detector 10 facing the end portion 21a is removed so as to form a pass or recess 15 through which the end portion 21a of the electroconductive membrane 21 is able to connect with the external device by means of wire bonding or the like. The recess 15 provides a through-hole through the silicon detector 10 from its top side to its bottom side.

To avoid generating small pieces or fragments or the like during the step of slicing a chip into wafers (i.e., the dicing step), an edge of the supporting frame 16 has a difference in level so as to provide a dicing region 18 having a width of over several tens of micrometers greater than that of the tool which is to be used in step of dicing.

Figure 5:
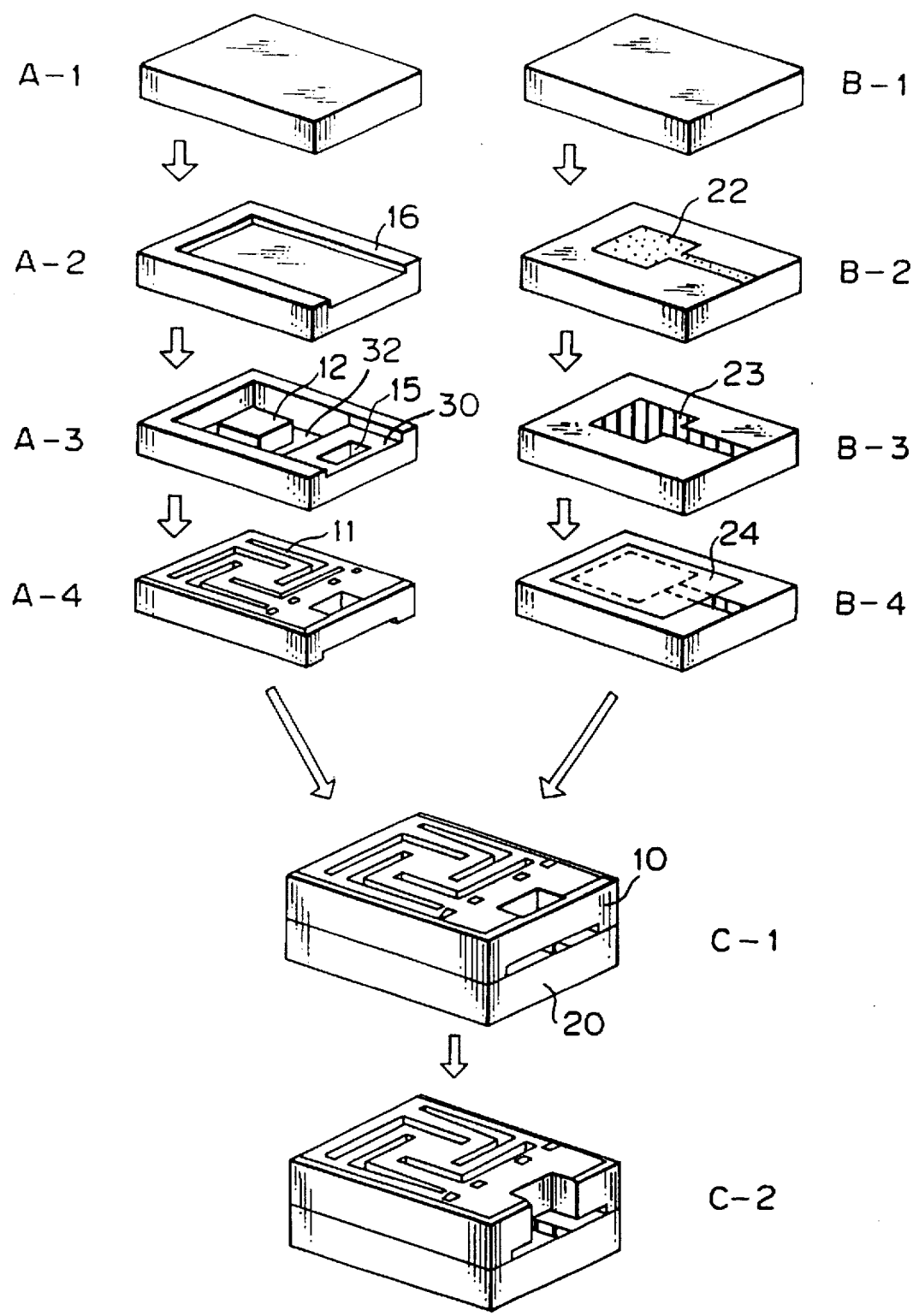
FIG. 5 represents steps in a process for manufacturing a semiconductor accelerometer in accordance with the present invention.

Hereinafter, the method of manufacturing a semiconductor accelerometer having the above construction will be described in detail. In FIG. 5, A-1 to A-4 are the steps for preparing a silicone wafer, B-1 to B-4 are the steps for preparing a glass substrate, and C-1 to C-2 are the steps for preparing a semiconductor acceleration sensor.

In the step A-1, a silicon wafer with predetermined dimensions is prepared.

In the step A-2, the silicon wafer is subjected to a gap formation procedure to form a supporting frame 16 having a U-shaped lip. The frame 16 is responsible for providing the gap 17 between the weight 12 and the glass base plate 20, and also it is very important to damp down vibrations and to generate electrostatic force. Therefore, the supporting frame should be processed in a precise manner. A preferable degree of damping and a preferable electrostatic force can be obtained by forming the gap so that it has a size in the range of 4 µm to 20 µm. If the gap is too small, the frequency-response region of the sensor becomes narrow due to over damping. If the gap is too big, on the other hand, the damping effect is reduced and the resonance of the structure cannot be suppressed, and the electrostatic force is not adequately generated.

In the step A-3, a surface of the silicon is processed so as to make a pattern of beams with a predetermined thickness and a gap portion for the recess 15 which permits access to the wiring on the glass. Furthermore, a plateau region 30 is left at the mouth-end of the U-shaped lip, but a cavity 32 is provided at the bottom end of the U and the weight 12 extends into the cavity.

In the step A-4, the opposite surface of the silicon is further processed so as to make through-holes to complete the beams and the gap portion.

In the step B-1, the glass substrate 20 having a predetermined dimension is prepared.

In the step of B-2, a Cr electroconductive film 22 is formed on the glass substrate 20. That is, the Cr film 22 is evaporated or sputtered on a surface of the glass substrate 20 taking account of the adhesive properties of the electroconductive membrane.

In the step B-3, an Al electroconductive film 23 is further formed on the glass substrate 20 by means of evaporation or sputtering.

In the step B-4, an SiO$_2$ insulation film 24 is formed on the part of the glass substrate facing the Al conductive film 23 so as to avoid contact between the Al conductive film 23 and the mass at the time of performing an electrostatic connection or applying an electrostatic force.

In the step C-1, the silicon substrate is electrostatically connected with the glass to obtain a wafer.

In the step C-2, the wafer is sliced so as to open a side of the gap portion, resulting in the recess 15 for wire-bonding to the glass's electroconductive film.

The method of calibrating the semiconductor acceleration sensor thus obtained will now be explained.

By applying a voltage V on the conductive membrane 21 formed on the glass substrate 20, an electrostatic force Fv as indicated by the following equation can be caused between the bottom surface of the weight 12 and the glass's conductive membrane 21.

$$Fv=0.5\times\epsilon\times\epsilon_o\times S\times(V/(d-\Delta X))^2$$

wherein $\epsilon$ denotes the relative dielectric constant of the medium between the glass substrate 20 and the weight 12, $\epsilon_o$ denotes the dielectric constant (F/M) observed in a vacuum, S denotes the area (m$^2$) of the bottom surface of the weight, d denotes the depth (m) of the gap 17, and $\Delta X$ denotes the displacement of the weight 12 caused by the electrostatic force.

In this case, the beams 11 act as a spring that generates spring tension Fk expressed by its spring constant k. The spring tension Fk is in harmony with the electrostatic force Fv at the position where the weight is shifted from the usual position as a result of the displacement $\Delta X$. Therefore their relation can be expressed with the following equation:

$$Fv=Fk(=K\times\Delta X)$$

The displacement $\Delta X$ under the above balanced condition can be replaced with the deviation observed during acceleration. Therefore, the electrostatic force Fv can be considered as artificial acceleration G to be used in the process of calibrating the sensitivity of accelerometer.

Figure 6:
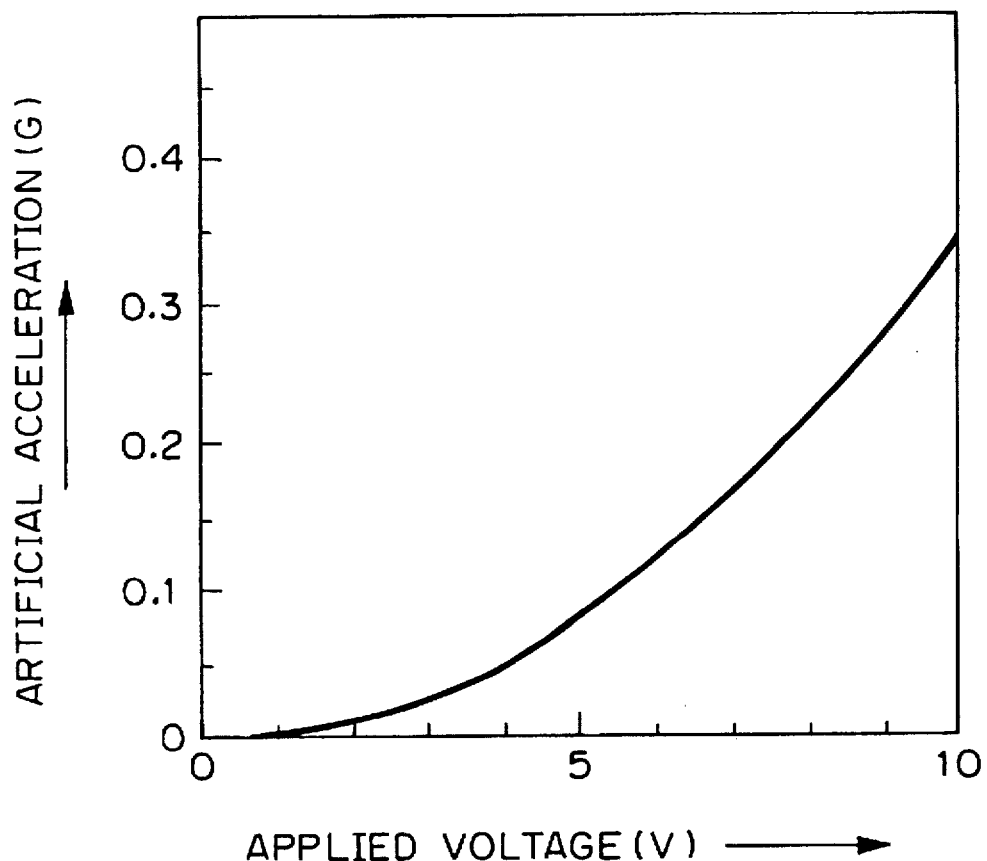
FIG. 6 represents a characteristic curve of the relationship between an applied voltage and artificial acceleration.

FIG. 6 shows the relationship between the artificial acceleration G and the applied voltage V which is responsible for generating the electrostatic force of the semiconductor accelerometer manufactured by the above manufacturing method. Accordingly, the accelerometer's sensitivity can be calibrated by using the curve in the figure as a calibration curve.

Instead of applying DC-voltage in FIG. 6, by the 5 way, AC-voltage may be applied. In this case, a comparatively high artificial acceleration can be attained by applying a comparatively low voltage having a frequency almost corresponding with the structure's characteristic frequency determined by the mass of the weight and the spring constant of the beam.

According to the semiconductor acceleration sensor of the present invention, the acceleration detector's weight can be displaced without restraint as a result of acceleration. In this case, in addition, a squeeze-film effect can be generated in the space between the weight and the glass substrate. Therefore the amplitude of oscillation of the silicon detector can be repressed by applying a damping action on the silicon detector's movement as a result of the above squeeze-film effect. Furthermore, as described above, the supporting frame of the silicon detector has a recess passing therethrough. The recess is responsible for connecting the substrate's potential with the ground potential or the potential of the current-supplying means for the Wheatstone bridge and its wiring can be extracted from the conductive membrane formed on the glass substrate by means of wire-bonding or the like.

According to the above construction, also, the accelerometer can be calibrated by using an electrostatic force as artificial acceleration, to be caused between the bottom surface of the weight and the surface of the glass substrate.

According to the above construction, furthermore, during the dicing step for two-layer cutting in the manufacturing process, the rate of the dicing can be set at a comparatively high level and results in almost no chipping in the dicing step.

What is claimed is:

1. A semiconductor acceleration sensor, comprising:
   a silicon detecting member having a weight, a supporting frame, at least one beam for coupling said weight with said supporting frame, and a recess from a top side of said silicon detecting member to a bottom side thereof, which are integrally processed from a silicon wafer;
   at least one semiconductor strain gauge formed on a surface of said at least one beam;
   a glass substrate electrostatically joined with said supporting frame of said silicon detecting member;
   a gap portion formed between an upper surface of said glass substrate and a lower surface of said weight; and
   a conductive film on said upper surface of said glass substrate, said conductive film including a first portion which faces said lower surface of said weight and which has an area larger than the area of said lower surface of said weight, said conductive film additionally including an elongated second portion which extends from said first portion of said conductive film toward an edge of said glass substrate and which is exposed by said recess so as to permit external wiring to be connected to said conductive film via said recess.

2. The semiconductor acceleration sensor as claimed in claim 1, wherein
   said gap portion has a width in the range of 4 µm to 20 µm.

3. The semiconductor acceleration sensor as claimed in claim 1, wherein
   said at least one beam comprises a plurality of beams arranged in the shape of a four bridge structure.

4. The semiconductor acceleration sensor as claimed in claim 1, wherein said recess is disposed at an edge of said silicon detecting member and protrudes into said silicon detecting member from said edge.

5. The semiconductor acceleration sensor as claimed in claim 1, wherein said supporting frame has a bottom side with a generally U-shaped peripheral lip, and wherein said glass substrate is joined to said peripheral lip.

6. The semiconductor acceleration sensor as claimed in claim 5, wherein said peripheral lip spaces said bottom side of said supporting frame apart from said glass substrate so as to provide a gap therebetween at an upper end of the U, said second portion of said conductive film extending through said gap at the upper end of the U.

7. The semiconductor acceleration sensor as claimed in claim 6, wherein said supporting frame provides a cavity at a lower end of the U, wherein said weight protrudes into said cavity, and wherein said gap at the upper end of the U communicates with the cavity.

8. A semiconductor acceleration sensor, comprising:
   a unitary silicon member having a top and a bottom, the bottom of the silicon member having a generally U-shaped peripheral lip and a cavity at a lower end of the U, the bottom of the silicon member additionally having a plateau region at a mouth end of the U, the top of the silicon member having at least one elongated beam, the silicon member additionally having a weight which is disposed in the cavity and supported by the at least one beam;

sensor means for sensing movement of the weight;

a glass substrate having a top to which the peripheral lip of the silicon member is electrostatically joined; and a conductive film on the top of the glass substrate, the conductive film having a first portion which faces a lower end of the weight and which has an area larger than the area of the lower end of the weight, and a second elongated portion which extends from the first portion of the conductive film toward an edge of the glass substrate through a gap between the glass substrate and the plateau region of the silicon member.

9. The semiconductor acceleration sensor as claimed in claim 8, wherein the silicon member has a side with a recess in it adjacent to the plateau region, the recess exposing the second portion of the conductive film.

10. The semiconductor acceleration sensor as claimed in claim 8, wherein said at least one beam comprises a plurality of beams.

11. The semiconductor acceleration sensor as claimed in claim 10, wherein the sensor means comprises strain gauges on the beams.

12. The semiconductor acceleration sensor as claimed in claim 8, wherein the at least one beam comprises a plurality of beams arranged in a four bridge structure, and wherein the sensor means comprises a plurality of strain gauges on each of the beams.

* * * * *